(12) United States Patent
Loureiro Benimeli

(10) Patent No.: US 6,170,542 B1
(45) Date of Patent: Jan. 9, 2001

(54) ELECTRONIC AIR DISPENSING AND PRESSURE BALANCING SYSTEM FOR TIRES

(75) Inventor: Fermin Jaime Loureiro Benimeli, Madrid (ES)

(73) Assignee: Fast Air S.L., Madrid (ES)

( * ) Notice: Under 35 U.S.C. 154(b), the term of this patent shall be extended for 0 days.

(21) Appl. No.: 08/981,464

(22) PCT Filed: Apr. 22, 1997

(86) PCT No.: PCT/ES97/00102

§ 371 Date: Jun. 25, 1998

§ 102(e) Date: Jun. 25, 1998

(87) PCT Pub. No.: WO97/39925

PCT Pub. Date: Oct. 30, 1997

(30) Foreign Application Priority Data

Apr. 22, 1996 (ES) .................................................. 9600911
Oct. 8, 1996 (ES) .................................................. 9602122

(51) Int. Cl.$^7$ ............................... B65B 1/30; B65B 3/28; B65B 57/06; B65B 57/14
(52) U.S. Cl. ........................... 141/192; 141/38; 141/47; 141/94; 141/95; 141/96; 141/99; 137/355.17; 137/355.23; 137/355.24
(58) Field of Search ................................ 141/38, 47, 192, 141/94–99, 234, 247, 285, 291; 137/355.17, 355.23, 355.24; 152/415, 416, 417

(56) References Cited

U.S. PATENT DOCUMENTS

| 3,913,632 | 10/1975 | Dudar . |
| 4,694,409 | 9/1987 | Lehman . |
| 4,875,509 | 10/1989 | Da Silva . |

FOREIGN PATENT DOCUMENTS

| 86 31 229 | 1/1987 | (DE) . |
| 0 605 743 | 7/1994 | (EP) . |
| 2 592 972 | 7/1987 | (FR) . |
| 58174051 | 10/1983 | (JP) . |

*Primary Examiner*—Henry J. Recla
*Assistant Examiner*—Timothy L. Maust
(74) *Attorney, Agent, or Firm*—Merchant & Gould P.C.

(57) ABSTRACT

Electronic air-supplying and pressure-equalizer system for tires, to be preferably installed at petrol stations, service areas, mechanical assistance points on roads or the like, similar to those comprising a compression unit, which, either through a deposit or directly, supplies a gas, preferably compressed air, to an inflating unit, which has several inflating conduits having, at their free ends, mechanisms for coupling the inflating conduits to a tire valve, as well as a structure for supporting the conduits, which is provided with a working unit or machine (1), including a housing (2), a metal framework (11), an electronic measuring instrument, and a pneumatic equipment (35) a propeller or compressor equipment, having an inner or outer compressing unit, a basis or supporting unit and an air-delivering unit (5).

18 Claims, 13 Drawing Sheets

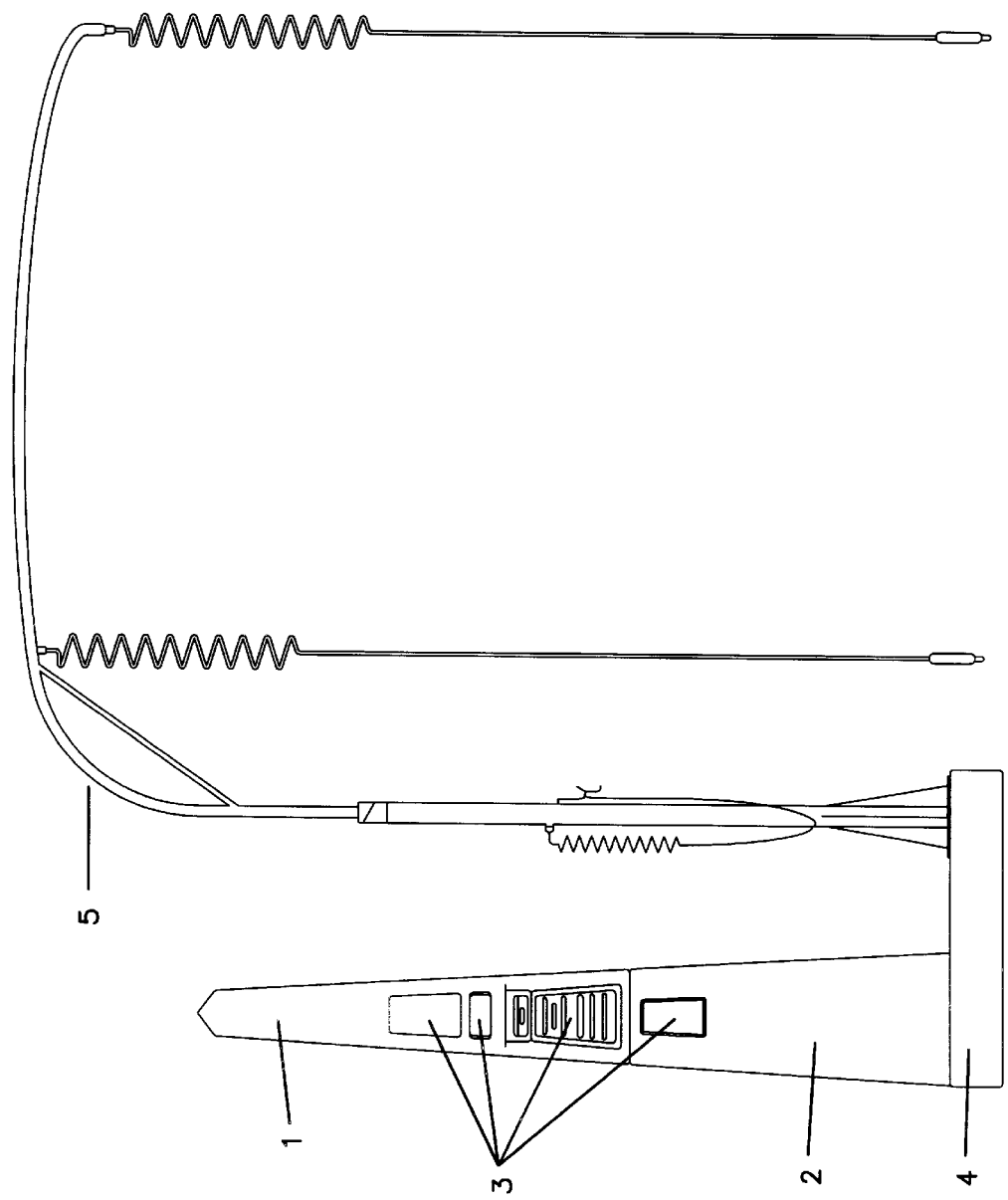

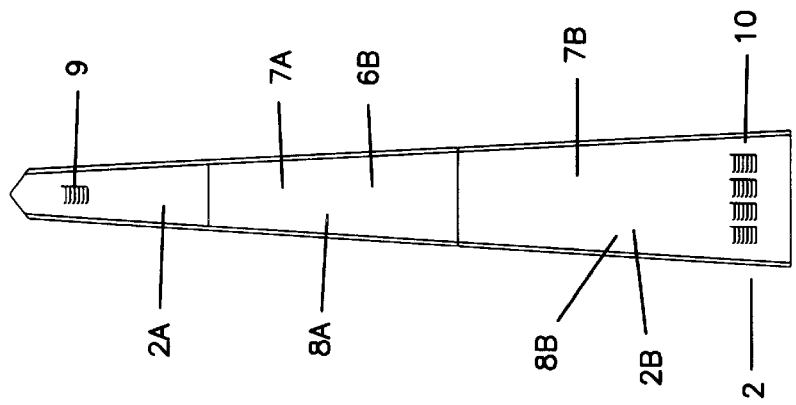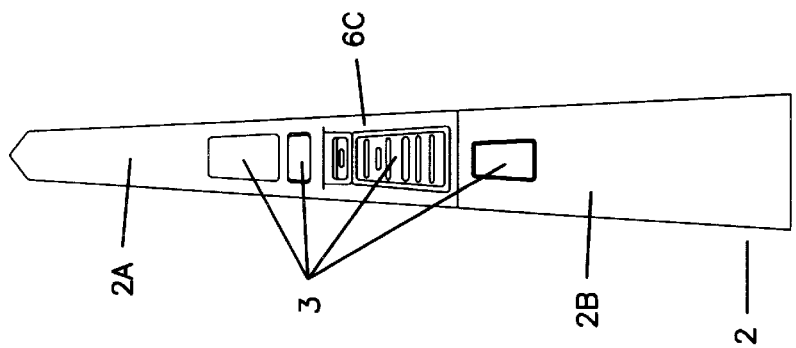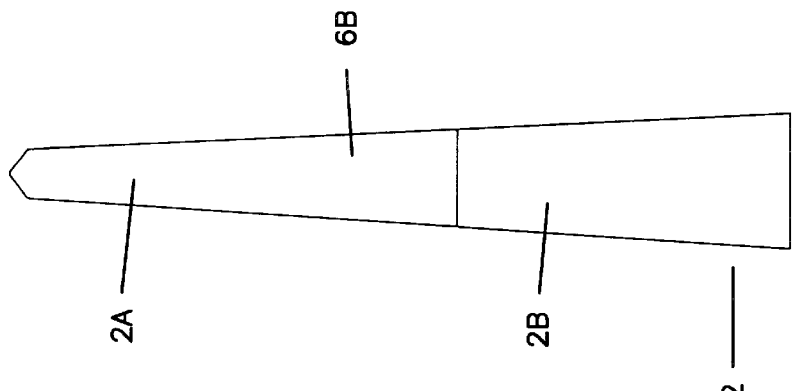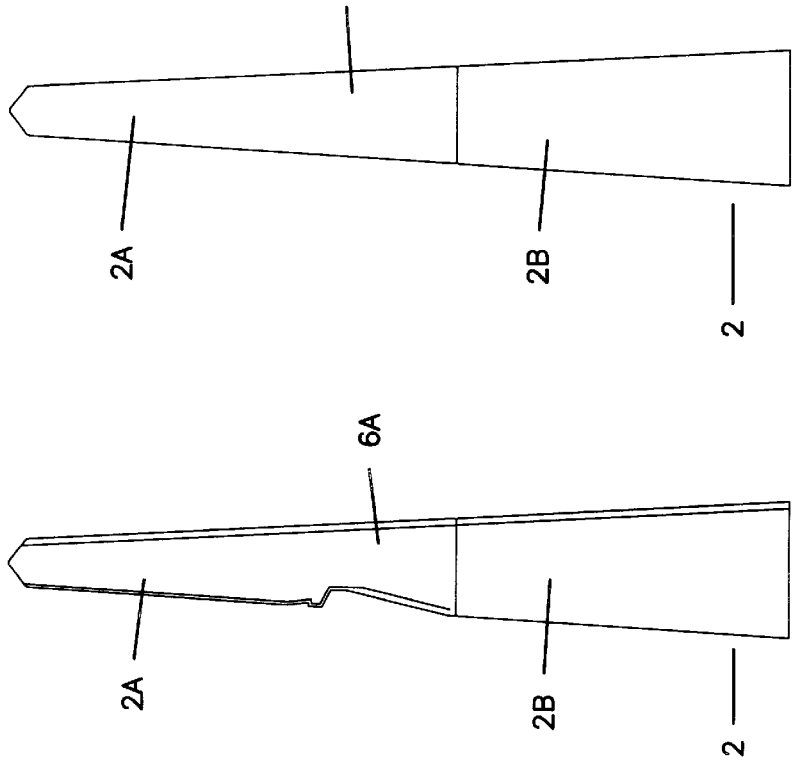

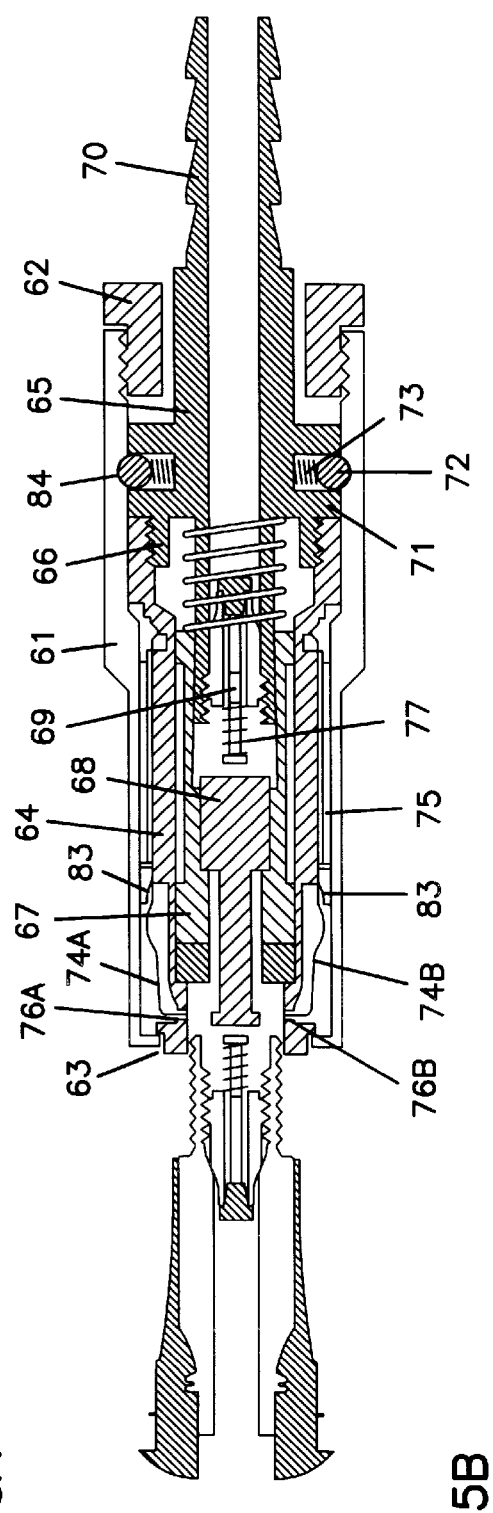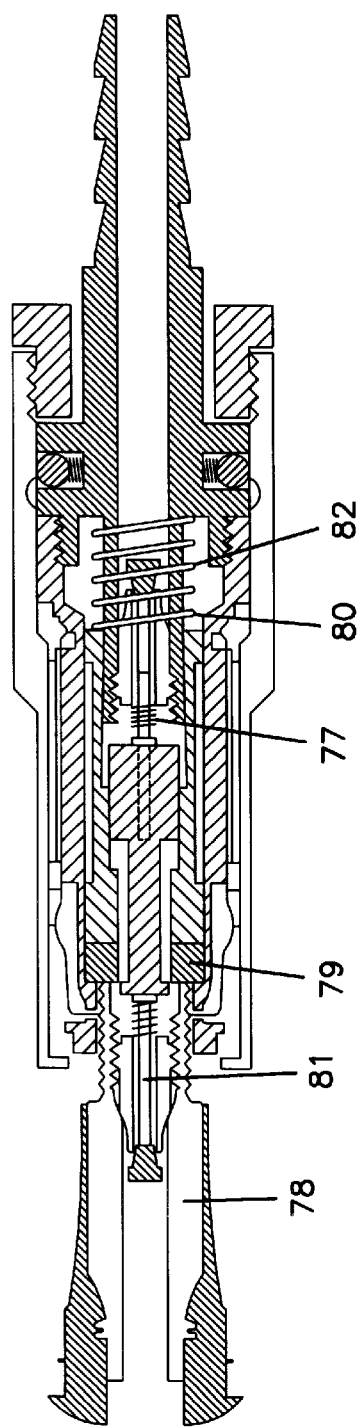
FIG. 5A
FIG. 5B

ELECTRONIC AIR DISPENSING AND PRESSURE BALANCING SYSTEM FOR TIRES

FIELD

The present invention relates, as the title indicates, to an electronic air supplying and pressure equalizer system for tires, to be preferably installed at petrol stations, service areas, mechanical assistance points on roads or the like, which has important advantages over installations nowaday existing.

BACKGROUND

Correct tire-inflating of vehicles in circulation is a determinant factor for road safety, as well as further economic factors such as tire durability or fuel consumption.

Nowadays, most assistance points located in petrol stations, service areas, mechanic assistance points on roads or the like have a variety of installations allowing a user to control or check the pressure condition of vehicle tires, which however have some detriments resulting in important drawbacks for the user of said installations.

Most inflating installations nowadays existing consist of a compression unit, which either through a deposit or directly, supplies a gas, preferably compressed air, to an inflating unit generally constituted by one only conduit or hose, in whose free end there is located the inflating valve which is coupled to the valve of a vehicle tire to be inflated or whose pressure is to be checked. Pressure control of each tire is carried out through a central control unit. Likewise, user has tables for pressure calibration, in order to determine the suitable tire pressure in each vehicle and under each driving condition.

However, this inflating installation structure has a series of drawbacks. Arrangement of one only inflating conduit or hose demands that a user suitably park the vehicle in order to thereby achieve the inflating of tires thereof without needing vehicle re-location during the operation of pressure checking in different tires. Even so, in most cases, in order to reach those tires faraway from the installation, user has to suitably park the vehicle again or, in the best condition, to juggle with the inflating hose, to pass it below or above the vehicle, as the unique manner to reach the tires.

Likewise, most inflating installations are not provided with automatic means for inflating hose withdrawal; therefore, in most installations of this kind, the hose is thrown to the ground or even in the zone where vehicles run in, which provokes its dirtiness, as well as rubber deterioration and subsequent breaking, with the important drawbacks and expenses that it bears.

On the other hand, calibration tables installed next to inflating systems nowaday existing are often not very useful and they are frequently incomplete.

Finally, studies carried out by the motor world demonstrate that most air supplying machines, due to their use, are damaged and they are not feasible, and that their signposting is deficient many times, then being totally unnoticed by user.

In order to efficiently overcome the detriments of inflating systems nowadays existing, the electronic air-supplying and pressure-equalizer system for tires of the present invention has been developed.

SUMMARY

The present invention relates to an air supplying and pressure-equalizer system for tires, to be preferably installed at petrol stations, service areas, mechanical assistance points on roads or the like, preferably comprising a working unit or machine, which is constituted as the main element of the system, from where operation of inflating vehicle tires is controlled and effected, the working unit being constituted by a housing, a metal framework, an electronic measuring instrument, a pneumatic equipment and means for visualization and control, a propeller or compressor equipment providing dry air from an inner or outer compression unit, a basis or supporting unit and an air delivering unit which conveys air from working unit or machine to vehicle tires and which permits, in the case of vehicles having two wheel in each axis, pressure balancing of tires belonging to the same axis.

More concretely, the working unit or machine allows the supply of any pressure to vehicle tires as well as pressure balancing in wheels of the same axis for vehicles with two wheels in each axis.

The working unit or machine is provided with a housing, constituted as the outside envelope and therefore as the cover which shapes the machine, suitable to protect inner elements, preferably made, at one side, of metal terne plate with surface corrosion proofing made of zinc, chromatized in electrolytic bath and a bicomponent polyurethane paint coating and, at the remaining sides, preferably made of materials resisting atmospheric agents, such as, preferably, a preferably self-quenching, high density expanded stiff polyurethane resin, with a, preferably bicomponent polyurethane enamel external coating. At the preferably metal side, one or more gates with joint hinges are provided, suitable to allow the access to inner elements in the machine, which are provided with a boxing with a drain and a rubber seal, as well as with a safety lock. Housing is further provided with ventilation means to obtain an air current inside which avoids moisture condensation on electronic components, such as, preferably, several ventilation screens preferably located at the upper and the lower portion of the housing.

Metal framework in the working unit or machine consists of a metal structure preferably built of L-shaped section profiles preferably bent forming right angles and burnt together, in order to provide the machine with rigidity and to support lateral stresses which may appear due to external agents such as wind. The metal framework is provided with a corrosion proofing coating, preferably constituted by a zinc electrolytic bath chromatized and epoxy-poliurethane paint. The metal framework is further provided with means for fixing the housing, preferably constituted by screws.

The measuring instrument in the working unit or machine consists of an electronic set comprising three intelligent modules, such as a visualizer-supervisory module, a keyboard module and an adjustment module, independently operated, each one having a microcontroller for the execution of that process commended to each module, preferably communicated by two wires in accordance with the specifications of the corresponding communication bus, as well as a pneumatic control and power supply module providing the necessary energy for the operation of the remaining modules, simultaneously managing the pneumatic equipment.

More concretely, the visualizer-supervisory module of the measuring instrument is constituted by a microcontroller, a series-parallel interface for managing the visualizer, a visualizer, a protected writing memory, a supply control circuit, a infrared receiving circuit, a battery and a load circuit. The module is in charge of presenting the pressure measure, in an intelligible manner, outside, storing the information introduced from outside through the keyboard module, as well as supervising the complete equipment operation, managing the information received from the remaining modules, deciding the process to be effected, and sending the appropriate orders through the communication bus to the remaining modules.

Keyboard module is in charge of receiving orders from outside and communicating them to the supervisory module for their interpretation and for acting in accordance with the criterion established by the program, and it is provided with a microcontroller, an interface between the intelligent element and the keyboard, preferably constituted by transistors, light indicators and, optionally, with cashing means, either by coins or by credit cards. Detection of the activation of a key, approval of a card-transaction or coin-acceptance are communicated by the communication bus to the supervisory module, the supervisory module determining the process (es) to be effected, including the orders to the keyboard module for activating or desactivating either the light indicators or the card (or coin) acceptor.

Adjustment module is in charge of recovering information about pressure and converting the information into digital information; it has a microcontroller, an analogical-digital converter with differential input, a low noise linear amplifier and a pressure transducer. The adjustment module converts information regarding to barometric pressure into a numerical digital value, operates the electrovalves and manually or automatically realize those necessary pressure-adjustment processes to achieve the desired pressure.

Finally, power supply consists of the circuit in charge of supplying the necessary energy to each one of the aforementioned modules for the correct operation thereof; it has voltage stabilizers such as, preferably, a circuit with a transistor and protection means, such as a filter located at the network input in order to avoid the production of radiofrecuence interferences. Additionally, it is provided with a power supply monitoring system, suitable to detect voltage drops below a safety value, and it supplies the initialization signal of modules. Finally, it includes an efficiency control for managing the pneumatic equipment by, preferably, optocoupling triacs indicating whether voltage is in those elements constituting the pneumatic equipment or not, as well as a monitoring of the correct operation of the pneumatic equipment.

Optionally, the electronic air supplying and pressure equalizer system for tires has a remote control for selecting the inflating pressure to be reached by the system. The remote control will have a keyboard, a converter of the electric signal generated by the keyboard to, preferably, infrared waves, and a transmitter for the waves, suitable to emit the signal corresponding to the value introduced by the remote control keyboard to the infrared receiving circuit installed in the working unit, preferably in its housing. The signal receiving circuit has a signal transducer converting the infrared signal received into an electric signal, which is directly sent to the visualizer-supervisory module of the measuring instrument, whose microcontroller generates the corresponding orders.

The keyboard installed in the remote control may be either a numerical keyboard, similar to those installed on the working unit and connected to the keyboard module, suitable for introducing any value, or one only key containing the entry of the value associated with the optimum pressure of vehicle tire, in which case remote control would be personal, associated with the vehicle.

Pneumatic equipment of working unit or machine is the element in charge of managing the air flow which will permit to fill up or to empty tires until achieving the pressure desired. The pneumatic equipment consists of four electrovalves communicating wheels with the pressure source or compressor, with the very measuring instrument and with the atmosphere. The electrovalves join together in a common node or hot node, to which the measuring instrument joins too.

Two electrovalves work simultaneously and are in charge of connecting distribution and connection means, such as hoses, coming from vehicle tires, to the hot node, so achieving a double effect. On the one hand, pressures into both tires get equal in accordance with the communicating vessels principle, and at the same time, it is possible to measure the pressure of the grip between the wheels. The use of two electrovalves does not permit the cross balancing of wheels as hoses change between one axis and the other.

Once the above set of tire electrovalves is open, one of the two remaining electrovalves joins the hot node with the compressor in order to thereby increase pressure.

Once the above set of tire electrovalves is open, the second of the two remaining electrovalves joins the hot node with the atmosphere in order to thereby decrease pressure.

Likewise, the pneumatic equipment has a non return valve located at the pneumatic set pressure inlet, in order to avoid that, in the absence of pressure inside the compressor, tires could deflate.

Pneumatic set is complemented with several means for protecting the measuring instrument against water and dirtiness existing in the installation and/or in the compressor, as well as against pressures higher than those which the measuring instrument can support, such as, preferably, a filter and a regulator.

The propeller or compressor equipment of the electronic air-supplying and pressure-equalizer system for tires provides dry air at a pre-established minimum pressure. The compressor can be either interior, so suitably sizing the outer housing in order to lodge the compressor, or external, in which case, a larger and therefore more powerful compressor can be used, thereby favoring the response time of the system.

The basis or supporting unit consists of a socle or pedestal, appropriate to support the working unit or machine and the air delivering unit, preferably parallelopipedic-wise shaped, open at its lower face, preferably made of steel plate, with corrosion proofing by electrolytic zinc bath, chromatized and bicomponent epoxy-polyurethane paint, which is provided with means for fixing to the ground by screws and retaining billets. The basis may optionally have a small gate for having access to the coin box existing inside the machine.

Air delivering unit is the unit in charge of managing the air from the working unit or machine to vehicle tires through several conduits or hoses; it has a structure for supporting the conduits or hoses, location means suitable to adapt the position of the conduits or hoses to vehicle tires to be inflated or whose pressure will be checked, and means for the return and/or automatic withdrawal of the conduits or hoses from their working position to their rest position. The air delivering unit configuration is therefore suitable to avoid that neither the conduits or hoses or their terminal connection mouthpieces drag on the ground, thereby avoiding the resulting deterioration and dirtiness.

Means for supporting conduits or hoses of the air delivering unit are preferably constituted with a structural rigidity capable of resisting such factors as the use by the users, climate conditions and, in inflating installations which place the supporting means on the ground, the weight of vehicles driving on the same.

The means for location of inflating conduits or hoses in vehicle tires basically depend on the practical embodiment of the electronic air-supplying and pressure-equalizer system for tires; they can be either static, where vehicle is which fits to the inflating installation, or movable, where the user manage the location means for coupling inflating conduits or hoses to vehicle tires. In any case, the location means are capable of making easier for the user the fitting of inflating conduits or hoses to vehicle tires.

Air delivering unit of the electronic air-supplying and pressure-equalizer system for tires of the present invention is provided with means for the return and/or automatic withdrawal of the conduits or hoses from their working position to their rest position, preferably constituted by automatic mechanisms for the return, withdrawal and/or rolling up of the inflating conduits or hoses as well as means for the location of the conduits or hoses, especially in the case of moveable location means.

In order to facilitate and achieve a better disposal of inflating conduits or hoses of the installation to the vehicle whose tires will be inflated or whose pressure will be checked, it becomes appropriate to provide different conduits or hoses preferably placed at both sides of the vehicle when it stops in the inflating installation to get on the corresponding process. Thereby, electronic air-supplying and pressure-equalizer system for tires preferably comprises two or four inflating conduits or hoses.

Optionally, electronic air-supplying and pressure-equalizer system for tires may be provided with a inflating conduit or hose specific for use in vehicles with two-wheels, such as bicycles, motorcycles or the like.

Additionally, inflating conduits or hoses have at their free ends, coupling means capable of coupling the inflating conduits or hoses to a tire valve and thereby getting on with the inflating or pressure checking in the corresponding tire.

The coupling means capable of coupling the inflating conduits or hoses to a tire valve preferably consist of a coupling nozzle, suitable for its easy and fast connection and disconnection of hoses (from the air supplying unit) with wheel valves, defined by a small diameter cylindrical configuration with a length suitable to reach the valve, in the case of this latter is lodged in a cavity, which is provided with automatic lockage means suitable to avoid air escape when nozzle is not connected to the valve.

More concretely, the coupling nozzle comprises a cylindrical shaped external piece or slide closed at its rear side by a screw cap, in whose opposite end it is provided with a circular opening suitable to get into the valve. Inside the external piece or slide, two pieces are lodged sliding in relation to the first one and mounted one with the other preferably by a screwed joint. Inside one of the pieces, the nearest to the tire valve, a hollow, internally stepped tubular piece is lodged sliding in relation to the piece which lodges it, and lodging a hammer consisting of a cylindrical rod which has a widening with a polygonal, preferably hexagonal cross-section suitable to avoid the return inside the tubular piece as well as to allow an air current between the interstices existing between polygon chords and circular section of the tubular piece. The tubular piece has, in its end nearest to the tire valve, a rubber conical seal, suitable to plug the air inlet hole. Finally, the tubular piece has two "L"-ended springs fastened by an external cylindrical collar. The "L"-end of the springs is introduced in several grooves made on the tubular piece nozzle. On the other hand, the second of the pieces lodged in the external piece or slide, that nearest to the air inlet through the external conduit or hose, has a cylindrical hollow inside, and it has a howitzer screwed in its fore end, similar to those lodged in vehicle valves, at whose free end it has a little spring and its rear portion externally ends in a series of, preferably culvertail shaped, projections, appropriate for a leakproof-coupling to the rubber of the external air conduit or hose, through which air from machine flows. Likewise, the piece has a circular crown-shaped internal widening which has four balls diametrically and normally opposite two by two, built in and pressed by elastic means such as, preferably, springs, the balls being faced to an inner groove made in the external piece or slide. Next to its internal widening and faced to the inside of the coupling nozzle, an inner spring is arranged surrounding the tubular outside of the piece, suitable to integrally move both pieces lodged in the external piece or slide, and thereby draw the balls out from the corresponding grooves. Finally, the external piece or slide is inside provided with a collar shaped like a truncated cone, suitable to press the "L"-ended springs when the integral set formed by the pieces has moved to the stop resulting from the screw cap closing the external piece or slide.

The electronic air-supplying and pressure-equalizer system for tires of the present invention whose configuration has been disclosed above, is provided with different modes of working which the user can select.

Therefore, the three modes of working which the electronic air-supplying and pressure-equalizer system for tires has are: checking balancing mode, manual inflating-balancing mode and automatic inflating-balancing mode.

Checking-balancing mode is selected by pressing a key arranged for that purpose in the keyboard forming a part of the keyboard module, provoking the opening of the adjustment module electrovalves, and it is used by the user in order to check tire pressure as well as to balance the pressure of tires belonging to the same axis in a vehicle, in the case of the axis as at least two tires, presenting the pressure existing inside the tire, once it has been determined by the electronic measuring instrument, on the visualizer of the visualizer-supervisory module of the measuring instrument.

Manual inflating-balancing mode allows the user to adjust the pressure as user wishes, by using inflating and deflating key(s) arranged on the keyboard forming a part of the keyboard module, therefore provoking the opening and/or closing of adjustment module electrovalves, by operating the corresponding elect valve, at the same time that pressure existing inside vehicle tires measured through the measuring instrument is displayed on the visualizer of the visualizer-supervisory module. Comparison of the information displayed the visualizer regarding to pressure existing inside the tires, with the pressure desired by the user to reach inside vehicle tires determines the inflating or the deflating action. Pressure balancing between tires belonging to the same axis is automatically carried out by the configuration of the system and, in particular, that of the electrovalves described above.

Automatic inflating balancing mode allows to adjust the pressure, as the user wishes, up to a value pre-established by him/her by introducing the corresponding value through the keyboard forming a part of the keyboard module either by the explicit numerical introduction by pressing the corresponding numerical keys arranged for that purpose, or by selecting any pre-determined value by pressing the only key arranged for that purpose. Once the pre-established value is elected, the machine automatically acts by suitably working the electrovalves until the preselected value is achieved, tire pressure being compared at every moment with t e predetermined value, and the machine acting consequently.

Optionally or additionally, the electronic air-supplying and pressure-equalizer system for tires, in terms of its working modes, can be provided with an acoustic warning device which indicates by an acoustic signal that system has finished the inflating-balancing process, so the predetermined value being reached, when the system works at the automatic inflating-balancing mode.

Finally, the electronic air-supplying and pressure-equalizer system for tire object of the present invention is provided with different selectable cashing modes such as free mode or payment mode as selected by system's operator and, when choosing the payment mode, it is provided with various options: coin payment or card payment, either with the own card comprising a determined number of services or with a money-card of any bank, eligible by the user. The coin-box comprises a groove through which the necessary coin(s) should be introduced in order to switch the system on. In the case of a defective coin were introduced and blocked up, it will be recovered by pressing the return button located below the groove, thereby the coin will appear in a box located below the button. Likewise, if the coin were inappropriate or the system were either unplugged from the network or on working, the coin would be automatically returned.

Optionally, the electronic air-supplying and pressure-equalizer system for tires object of the present invention can be provided with means for remote control from a central station in order to test the condition of the system, as well as, when necessary, to periodically count up the money collected in the system. The remote control means are preferably established by communication via modem acting on the checking and/or counting unit located inside the system of the present invention.

Additionally, the electronic air-supplying and pressure-equalizer system for tires of the present invention can be optionally provided with a transmitter-receiver system in order to consider, along the pressure adjustment process, some parameters such as, in particular, temperature. For that, a tire valve is arranged, provided with a temperature measurer, a transducer converting the temperature signal into an electric signal, and a transmitter, preferably operated by radiofrecuence or infrared waves, sending the electrical signal converted into radiofrecence waves or infrared radiation, up to a receiver arranged in the electronic air-supplying and pressure-equalizer system for tires, preferably on its housing. The signal received is converted into an electric signal and sent to the visualizer-supervisory module, whose microcontroller will suitably estimate the tire temperature pondering factor regarding to the selected pressure, therefore generating the corresponding correction factor.

Likewise, the electronic air-supplying and pressure-equalizer system for tires of the present invention is provided with means for indicating the working and the end of operating such as, preferably, a decorative system, such as, for example, a windmill electrically connected to the visualizer-supervisory module to work its spin movement while machine is working, as well as a sound warning capable of emitting an acoustic signal once the process of tire inflating and/or pressure balancing between tires of the same axis has finished.

The electronic air-supplying and pressure-equalizer system for tires of the present invention may consist of one only unit, as disclosed above or adopt a modular design so becoming a multi-station, multi-user and multi-function system. In this case, the system will comprise a centre for managing the plurality of terminal service stations, as well as a set of autonomous use terminals, subjected to the managing centre. Different elements disclosed above will be distributed among different components of the multi-station system. Therefore, managing centre will include a compressor, owning to the centre where it is installed, a general control circuit, suitable to carry out the acceptance of cashing means, store transactions, control service times, and manage communications, as well as a communication module, preferably via modem. On the other hand, autonomous use terminals will be provided with a visualization device, a pressure control, a keyboard control, a cashing control, including a coin box and a card reader, as well as a pressure transducer. Particular disposal as well as features of each autonomous terminal will be able to adopt any embodiment to which reference is made below for the electronic air-supplying and pressure-equalizer system for tires of the present invention. Likewise, it is appropriate to underline that compressor placed in the managing centre will be suitably sized to do a service to the different autonomous terminals simultaneously, or at least to a determined number of them, simultaneously.

From all that has been disclosed above, many advantages provided by the electronic air-supplying and pressure-equalizer system for tires of the present invention are apparent, such as the convenience and easiness for using the system by the user, as well as the cleaning derived from the fact that the system has a air delivering unit comprising a support and a gyratory arm, whose configuration avoids that hoses or conduits in charge of bringing air from system up to tires would get thrown to the ground being spoiled or broken, thanks to having automatic means for the withdrawal of inflating hoses, and its feasibility, thanks to having suitable remote checking means.

BRIEF DESCRIPTION OF THE DRAWINGS

In order to better understand the object of the present invention, a preferred practical embodiment of the electronic air-supplying and pressure-equalizer system for tires, is next disclosed based on figures herein attached. In the figures, the following is shown:

FIG. 1 shows a frontal view of a first embodiment of the electronic air-supplying and pressure-equalizer system for tires of the present invention.

FIGS. 2a, 2b, 2c and 2d show lateral views of the housing of the working unit of the present practical embodiment of the electronic air-supplying and pressure-equalizer system for tires of the present invention.

FIGS. 5a and 5b show two cross-section views of the nozzle for coupling the inflating conduits or hoses to a tire valve, standing for, respectively, the rest and load conditions, i.e., when all air inlets are open.

DETAILED DESCRIPTION

Figure 3:
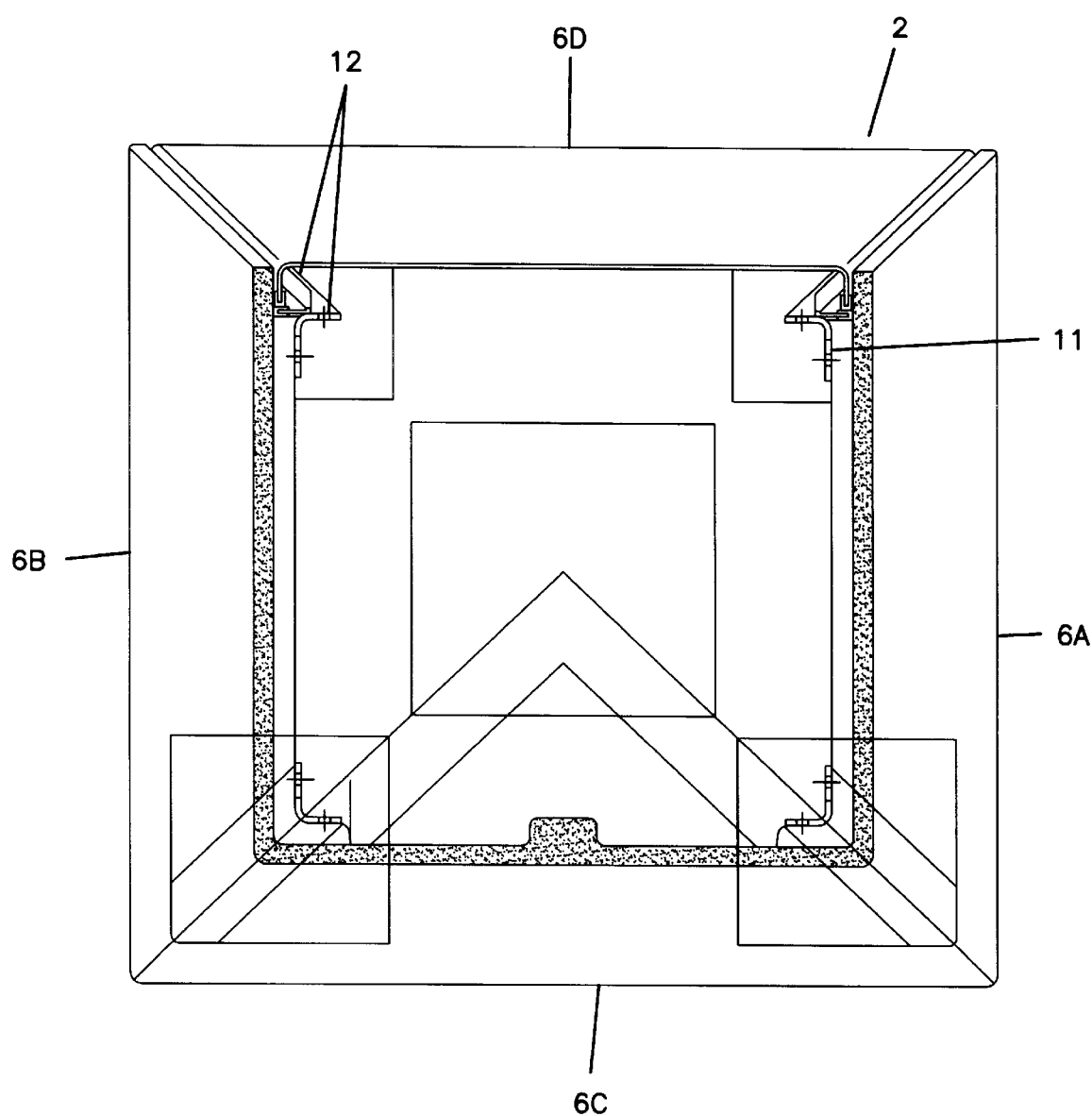
FIG. 3 shows the transversal cross-section of the housing and metal framework of the working unit of the electronic air-supplying and pressure-equalizer system for tires of the present invention.

FIG. 1 shows a practical embodiment of the electronic air-supplying and pressure-equalizer system for tires consisting of a working unit or machine (1), which is constituted as the main element of the system, from where the process of inflating vehicle tires is controlled and carried out, which allows the supply of any pressure to the vehicle tires as well as the pressure balancing between wheels of the same axis, in the case of vehicles having two wheels at each axis, wherein there are shown the housing (2) and the visualization and control means (3) from the working unit. Likewise, the electronic air-supplying and pressure-equalizer system for tires consists of a propeller or compressor equipment (not shown in figure), which provides dry air from an internal or external compressor unit, a basis or supporting unit (4) and an air delivering unit (5) conveying air from the working unit or machine (1) up to vehicle tires and which, in the case of vehicles with two wheels at each axis, allows pressure balancing between tires of the same axis.

FIGS. 2a, 2b, 2c and 2d show the housing (2) of the working unit constituted as the external envelope shaped as a square-base truncated pyramid. In order to make its construction easier, housing (2) is divided into two, upper (2a) and lower (2b) portions, leakproof linked together. So that, the housing (2) is the coating which shapes the machine, suitable to protect internal elements. Housing (2) is made, at one of its sides (6d) (FIG. 2d), of metal terne plate with surface corrosion proofing made of zinc, chromatized in electrolytic bath and a bicomponent polyurethane paint coating. At the remaining sides (6a, 6b, 6c) (FIGS. 2a, 2b, 2c), the housing (2) is made of materials resisting atmospheric agents, such as a preferably self-quenching, high density expanded stiff polyurethane resin, with a, preferably bicomponent polyurethane enamel external coating. At the metal side (6d) two gates (7a, 7b) with joint hinges are provided, to allow the access to inner elements in the machine, which are provided with a boxing with a drain and a rubber seal, as well as with a safety lock (5a, 5b). Housing (2) is further provided, preferably located at the metal side (6d), with air inlet screens located at the upside (9) and downside (10) of the housing (2), in order to allow an inner air current which avoids moisture condensation on electronic components.

At the fore side (6c), housing is provided with means for coupling visualization and control means (3) of the system, such as, preferably, a visualization display, a keyboard and various cashing means (FIG. 2c).

FIG. 3 shows a transversal cross-section of housing (2) and metal framework (11). As it is noticeable from the figure, metal framework consists of a metal structure made of L-shaped cross-section profiles (12) preferably bent forming right angles and burnt together, in order to provide the machine with rigidity and to support lateral stresses which may occur due to external agents such as wind. The metal framework (11) is provided with a corrosion proofing coating, preferably constituted by a zinc electrolytic bath, chromatized and epoxy-poliurethane paint. The metal framework (11) is further provided with means for fixing the housing, preferably constituted by screws (not shown in figure).

Air delivering unit (5) of the electronic air-supplying and pressure-equalizer system for tires of the present invention is the unit in charge of conveying air from the working unit or machine (1) up to vehicle tires. The air delivering unit (5) is provided with a structure for supporting the conduits or hoses, with location means suitable to adapt the location of the conduits or hoses up to vehicle tires to be inflated or whose pressure is to be checked, and with means for automatic return or withdrawal of the conduits or hoses from their working position up to their rest position.

Figure 4A:
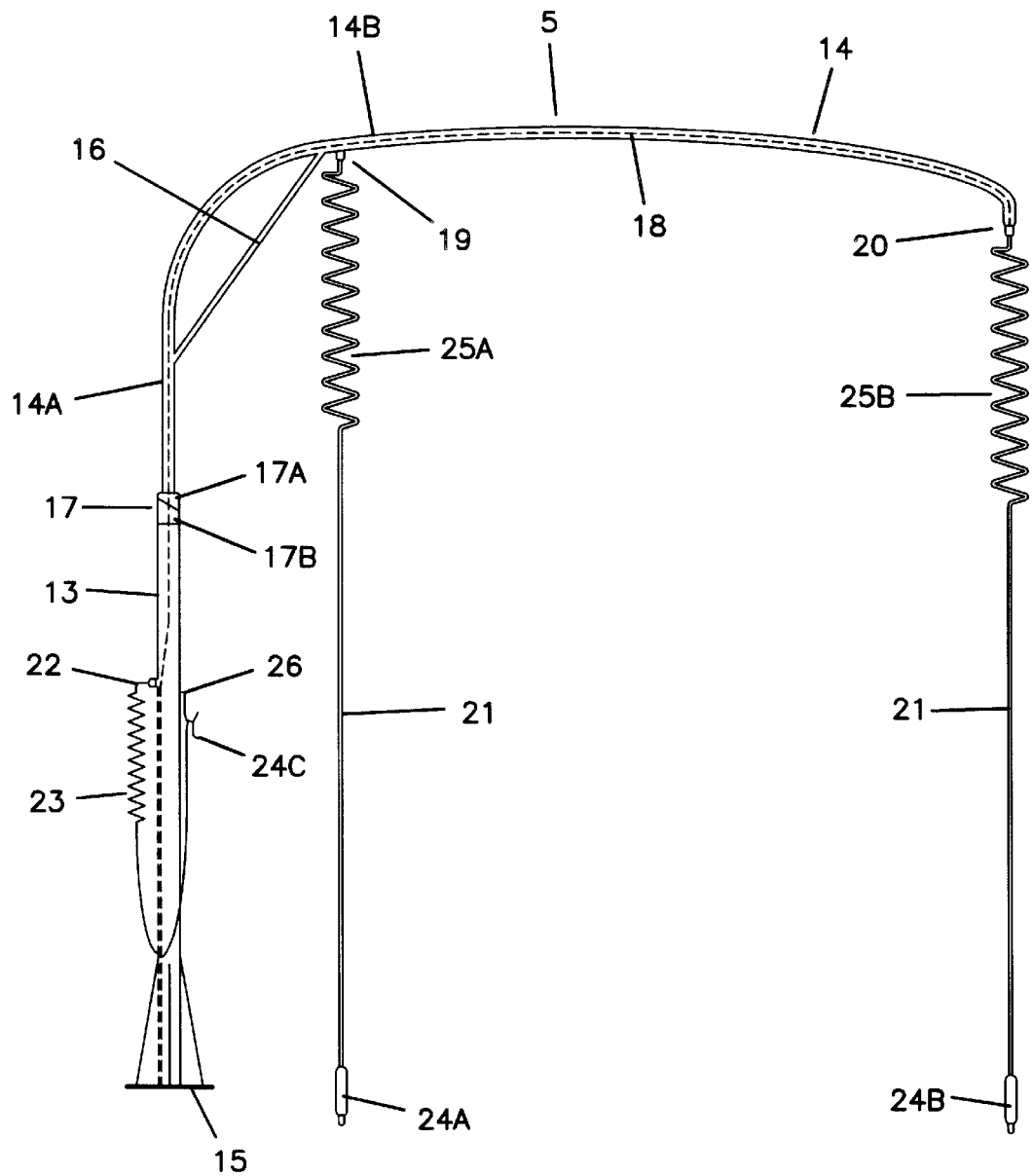
FIGS. 4a and 4b show, respectively, a front view and a plan view of the air delivering unit consisting of a support and a gyratory arm.
Figure 4B:
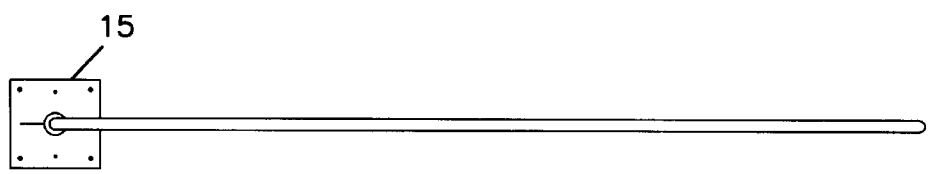
Figure 6B:
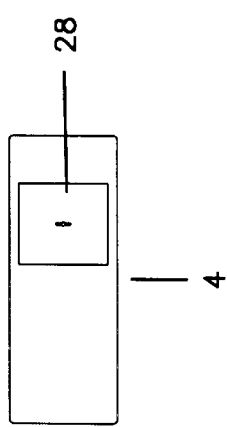
FIGS. 6a, 6b, 6c, 6d and 6e show, respectively, a front view, a lateral view, a plan view and two transversal and longitudinal, cross-section-views of the basis or supporting unit.
Figure 6E:
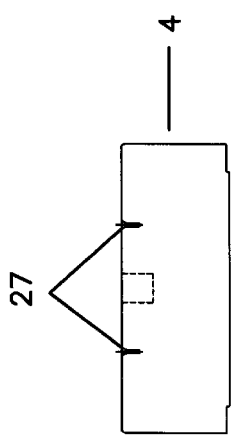
Figure 6A:
Figure 6C:
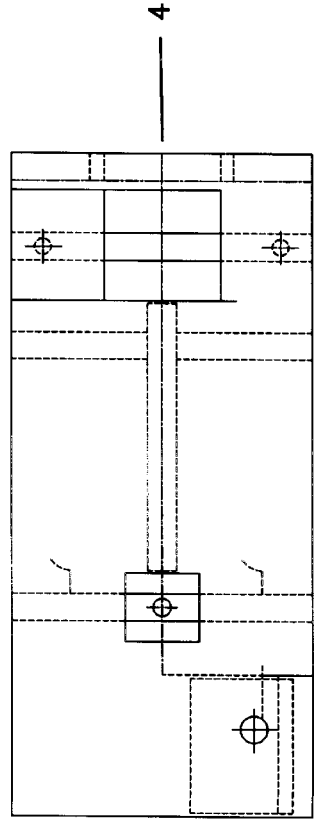
Figure 6D:
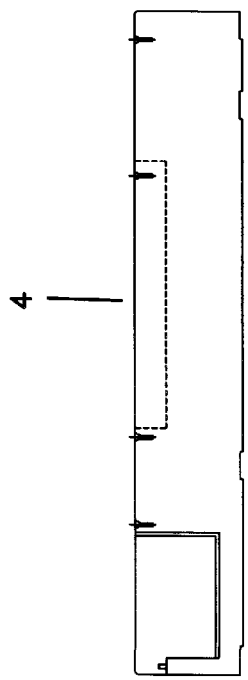

FIGS. 4a and 4b show a practical embodiment of the air delivering unit (5) comprising a support (13) and a gyratory arm (14). Support (13) consists of a hollow tube made of painted steel, at whose lower end it has means for fixing to the basis (4) of the electronic air-supplying and pressure-equalizer system for tires, preferably consisting of an anchorage plate (15) to screw on the basis (4). Gyratory arm (14) comprises a first vertical tubular stretch (14a) from whose end, a second tubular stretch (14b) extends describing a 90° curve until getting horizontal, i.e., parallel to the ground, and a diagonal bar (16) for supporting and reinforcing the horizontal tubular stretch (14b). The height at which the horizontal tubular stretch (14b) is placed is preferably of more than 1.70 m, and, in any case, in accordance with the height of vehicles to operate with the present inflating installation.

Air delivering unit (5) is provided with location means, which allow a 90°–80° rotation of the upper tubular stretch of the arm (14) around the lower tubular stretch or support (13), from its rest position considered as that in which the upper horizontal tubular stretch (14b) is substantially placed parallel to the longitudinal axis of a vehicle parked next to the inflating system, up to its working position, considered as that in which the upper horizontal tubular stretch (14b) is substantially placed perpendicular to the longitudinal axis of a vehicle parked next to the inflating system, in order to proceed to inflate the tires located at each side of the vehicle parked or to check the pressure thereof. The location means consist of the arm (14) rotation means arranged at the upper end, such as, preferably, a nylon bearing (17) composed of two coupled cylinders (17a, 17b), slant wise cross-sectioned, so that when arm (14) rotation is effected, the bearing (17) forces it to return to its natural position.

Through the inside of the support (13) and arm (14), tubes (18) run, entering by the support (13) basis, and through which air from working unit (1) or machine flows. The arm (14) has two outlet holes (19, 20) to lead hoses (21) out to vehicle tire. The gap between the outlet holes (19, 20) is preferably between 1.75 m and 2.80 m; more preferably between 1.90 m and 2.50 m and, in any case, in accordance with the width of vehicles to be operated with the present inflating installation. Likewise, support (13) of the air delivering unit (5) has a lateral hole (22) for the outlet of a inflating conduit or hose (23) specific for being used in vehicles with two wheels, such as bicycles, motorcycles or the like.

Likewise, air delivering unit (5) is provided with means for automatic return or withdrawal of the conduits or hoses (21) from their working position up to their rest position, each consisting of, firstly, vertical coilings (25a, 25b) for lifting, return and/or withdrawal of inflating conduits or hoses (21) arranged on the upper horizontal tubular stretch (14b) of the gyratory arm (14) described above, to withdraw inflating conduits or hoses (21) from their stretched position to reach inflating valves of tires, up to their withdrawn position, in which they hang from the upper horizontal stretch without touching the ground, in order to avoid spoiling thereof and, secondly, the preferably 90° to 180° gyratory device with automatic gravitatory return disclosed above, which effects the automatic gravitatory return movement of the upper tubular horizontal stretch around the point of coupling between support (13) and the gyratory arm (14), from the working position up to the rest position.

Conduit or hose (23) for operating vehicles with two wheels, such as bicycles, motorcycles, motor bikes or the like, is provided with supporting means for its rest position, for example, shaped as a hook (26), and manual or, optionally automatic means for return and/or withdrawal (not shown in the figure).

Additionally, inflating conduits or hoses (21), at their free ends, are provided with coupling means (24a, 24b, 24c) suitable to couple the inflating conduits or hoses (21, 23) to tire valve and thereby proceed to the inflating or pressure checking of the corresponding tire. As it may be shown, the coupling means (24c) for vehicles with two wheels has a 90°-bended shape in order to facilitate its coupling to the tires of the vehicles.

FIGS. 5a and 5b represent, in detail, the cross-section of the coupling means suitable to couple the inflating conduits or hoses to tire valve (78), constituted by a coupling nozzle, suitable to its easy and fast connection and disconnection of hoses (from the air delivering unit) with valves (78) in wheels, defined by a small diameter cylindrical configuration with a length suitable to reach the valve (78), in the case of the latter is lodged in a cavity, which is provided with automatic lockage means suitable to avoid air escape when nozzle is not connected to the valve (78).

More concretely, the coupling nozzle comprises a cylindrical shaped external piece or slide (61) closed at its rear side by a screw cap (62), in whose opposite end it is provided with a circular opening (63) suitable to get into the valve (78). Inside the external piece or slide (61), two pieces (64, 65) are lodged sliding in relation to the first (61) and mounted one with the other preferably by a screwed joint (66). Inside one of the pieces (64), the nearest to tire valve (78), a hollow, internally stepped tubular piece (67) is lodged sliding in relation to the piece (64) which lodges it, and lodging a hammer (68) consisting of a cylindrical rod which has a widening with a polygonal, preferably hexagonal, cross-section, suitable to avoid the return inside the tubular piece (67) as well as to allow an air current between interstices existing between polygon chords and circular section of the tubular piece (67). The tubular piece (67) has, in its end nearest to tire valve (78), a rubber conical seal (79), suitable to plug the air inlet hole. Finally, the tubular piece (67) has two "L"-ended springs (74a, 74b) fastened by an external cylindrical collar (75). The "L"-end of the springs (74a, 74b) is introduced in several grooves (76a, 76b) made on the tubular piece (67) nozzle. On the other hand, the second (65) of the pieces lodged in the external piece or slide (61), that nearest to the air inlet through the external conduit or hose, has a cylindrical hollow inside, and it has a howitzer (69) screwed in its fore end, similar to those lodged in vehicle valves, at whose free end it has a little spring (77) and its rear portion externally ends "in a series of, preferably culvertail shaped, projections (70), which is suitable for a leakproof coupling to the rubber of the external air conduit or hose, through which air from machine flows. Likewise, the piece (65) has a circular crown-shaped internal widening (71) which has four balls (72) diametrally and normally opposite two by two, built in and pressed by springs (73), the balls (72) being faced to an inner groove (84) made in the external piece or slide (61). Next to the circular crown-shaped internal widening (71) and faced to the inside of the coupling nozzle, an inner spring (80) is arranged surrounding the tubular outside of the piece (65), suitable to integrally move both pieces (64, 65) lodged in the external piece or slide (61), and thereby draw said balls (72) out from the corresponding grooves (84). Finally, the external piece or slide (61) is inside provided with a collar (83) shaped like a truncated cone, suitable to press the "L"-ended springs (74a, 74b) when the integral set formed by the pieces (64, 65) has moved to the stop resulting from the screw cap (62) closing the external piece or slide (61).

FIG. 5b shows a cross-sectioned view of the nozzle for coupling the inflating conduits or hoses to tire valve (78) at its loading condition, i.e., when all air inlets are open, which will facilitate the understanding of the coupling nozzle operation.

Vehicle valve (78) is introduced by the fore end of coupling nozzle, through the inside of the piece (64) lodged into the external piece or slide (61), pushing the hammer (68), which internally slides along the tubular piece (67) lodged into the piece (64). Hammer (68), along its movement, pushes the internal piston of howitzer (69), thereby overcoming the resistance of its internal spring (77), and opening the air inlet hole (82), originally closed by the rubber conical seal (79), so beginning to move the tubular piece (67), which has to overcome the resistance of spring (80) surrounding the tubular outside of the second piece (65) lodged into the external piece or slide (61), until it begins to move the integral set of pieces (64, 65), thereby drawing balls (72) out from the corresponding grooves (84).

Resistances of the springs (77, 80) are transmitted in the opposite sense to the rod (81) of howitzer in tire valve (78), which as a result opens, thereby allowing air to flow.

When the integral set formed by pieces (64, 65) lodged into the external piece or slide (61) has moved up to the stop resulting from the screw cap (62) closing the external piece or slide (61), springs (74a, 74b) integral with the piece (64) are pressed by a collar (83) shaped like a, truncated cone located into the external piece or slide (61), so that the "L"-shaped end of the springs (74a, 74b) juts out the corresponding grooves (76a, 76b) clamp-wise embrazing the valve (78), entering into the strias of the same and avoiding it to return.

In this position, shown in FIG. 5b, with the valve (7.8) clogged, air flow is free all along the run, and on the other hand, coupling nozzle is in a stable position, which can be unblocked only by pulling the external piece or slide (61), disconnecting the "L"-ended springs (74a, 74b), balls (72) entering again into their corresponding grooves (84), the air flow conduits being closed back again by means of springs, the whole set becoming to the rest position and vehicle valve (78) being loose.

FIGS. 6a, 6b, 6c, 6d and 6e show different views of the basis or supporting unit (4), consisting of a socle or pedestal, appropriate to support the working unit or machine (1) and the air delivering unit (5). The support or basis is parallelopipedic-wise shaped, open at its lower face, made of steel plate, with corrosion proofing by electrolytic zinc bath, chromatized and bicomponent epoxy-polyurethane paint. Likewise, it is provided with means for fixing to the ground by screws (27) and retaining billets (not shown in figure).

The basis may optionally have a small gate (28) for having access to the coin box existing inside the machine.

Figure 7:
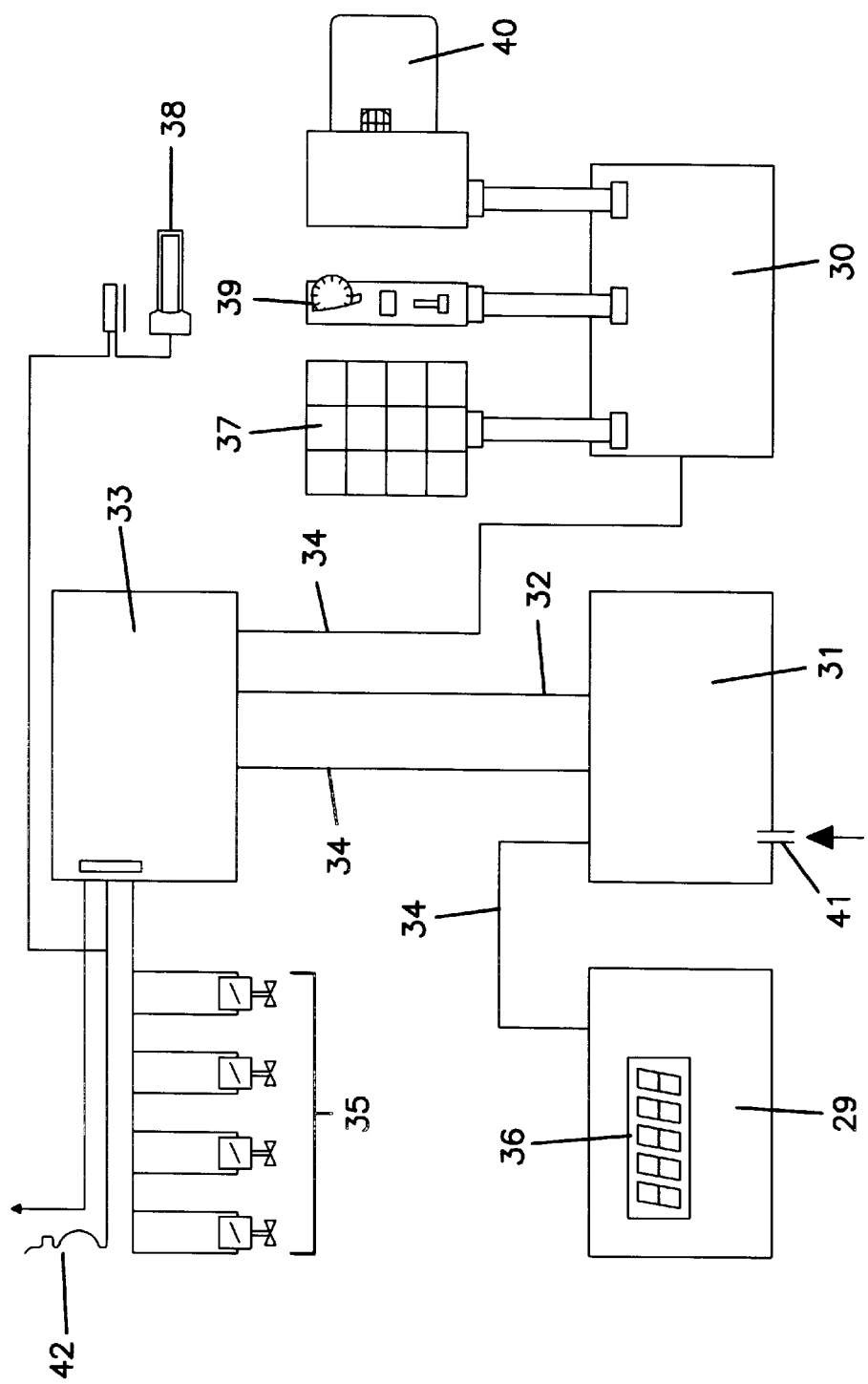
FIG. 7 shows the electric sketch of the present practical embodiment of the electronic air-supplying and pressure-equalizer system for tires of the present invention.

FIG. 7 shows an electronic sketch of the measuring instrument of the working unit or machine (1). The working unit (1) is constituted by an electronic set formed by three intelligent modules, such as a visualizer-supervisory module (29), a keyboard module (30) and an adjustment module (31), independently operated, each one having a microcontroller for the execution of that process commended to each module, preferably communicated by two wires in accordance with the specifications of the corresponding communication bus (32), as well as a pneumatic control and power supply module (33) providing the necessary energy for the operation of the remaining modules through the corresponding supply buses (34), simultaneously managing the pneumatic equipment (35).

The visualizer-supervisory module (29) of the measuring instrument is constituted by a microcontroller, a series-parallel interface for the managing of the visualizer, a visualizer (36), a protected writing memory, a supply control circuit, an infrared receiving circuit, a battery and a load circuit. The module is in charge of presenting the pressure measure, in an intelligible manner, outside, storing the information introduced from outside through the keyboard module (30), as well as supervising the complete equipment operation, managing the information received from the remaining modules, deciding the process to be effected, and sending the appropriate orders through the communication bus (32) to the remaining modules.

Keyboard module (30) is in charge of receiving orders from outside and communicating them to the supervisory module (29) for their interpretation and for acting in accordance with the criterion established by the program, and it is provided with a microcontroller, an interface between the intelligent element and the keyboard (37), preferably constituted by transistors, light indicators (38) and, optionally, with cashing means, either by coins (39) or by credit cards, money cards or the like (40). Detection of the activation of a key, approval of a card-transaction or coin-acceptance are communicated by the communication bus (32) to the supervisory module (29), the supervisory module (29) determining the process(es) to be effected, including the orders to the keyboard module (30) for activating or deactivating either the light indicators (38) or the card (40) or coin (39) acceptor.

Adjustment module (31) is in charge of recovering information about pressure and converting the information into digital information; it has a microcontroller, an analogical-digital converter with differential input, a low noise linear amplifier and a pressure transducer (41). The adjustment module (31) converts information regarding to barometric pressure into a numerical digital value, operates the pneumatic system (35) electrovalves and manually or automatically realizes those necessary pressure-adjustment processes to achieve the desired pressure.

Finally, power supply (33) consists of the circuit in charged of supplying the necessary energy to each one of the fore-mentioned modules for the correct operation thereof, it has voltage stabilizers such as, preferably, a circuit with a transistor and protection means, such as a filter (42) located at the network input in order to avoid the production of radiofrecuence interferences. Additionally, it is provided with a power supply monitoring system, suitable to detect voltage drops below a safety value, and it supplies the initialization signal to modules. Finally, it includes an efficiency control for managing the pneumatic equipment by, preferably, optocoupling triacs indicating whether power is in those elements constituting the pneumatic equipment (35) or not, as well as a monitoring of the correct operation of the pneumatic equipment (35).

Figure 8:
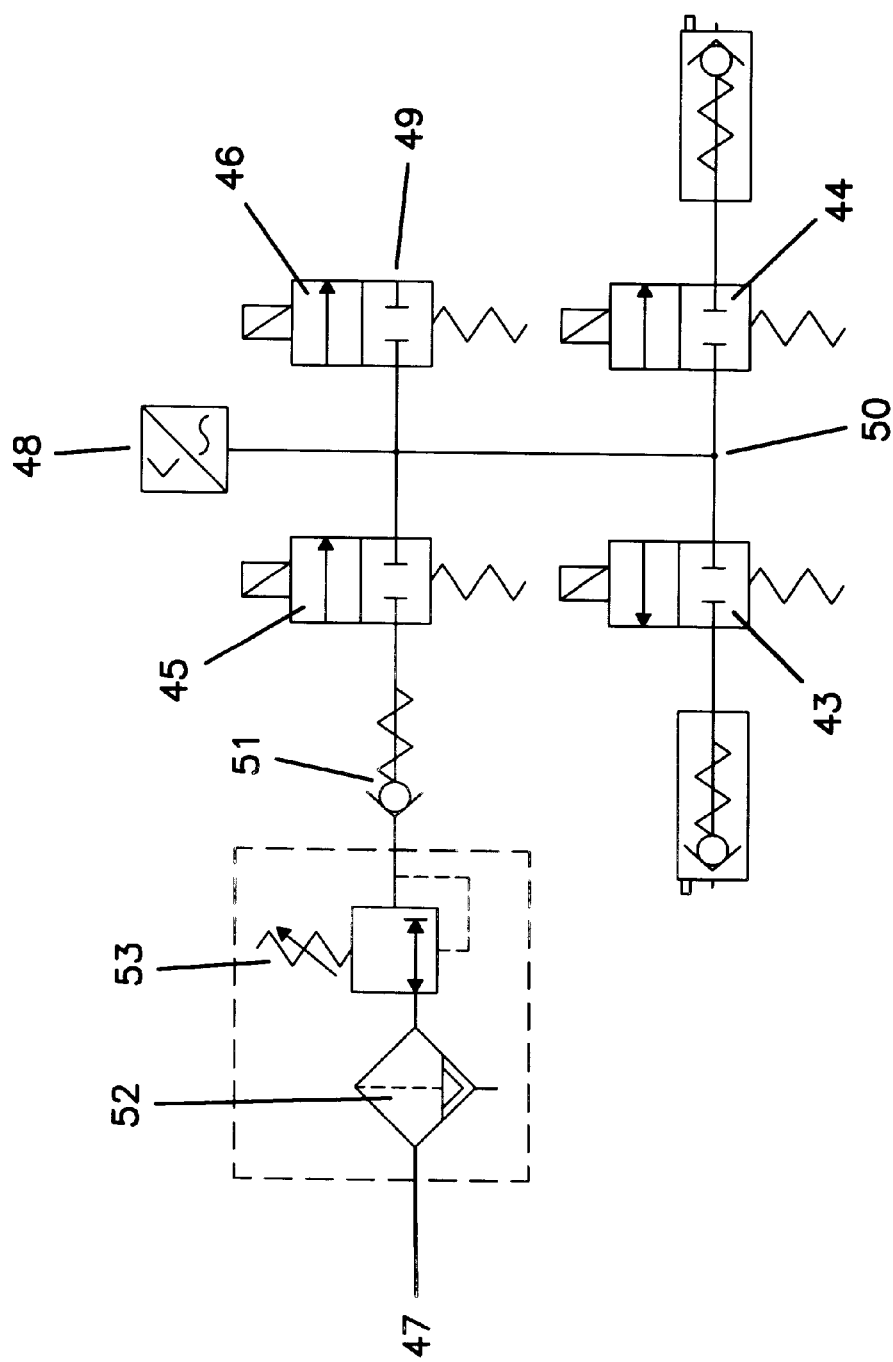
FIG. 8 shows the pneumatic sketch of the present practical embodiment of the electronic air-supplying and pressure-equalizer system for tires of the present invention.

FIG. 8 shows the pneumatic sketch of the present practical embodiment of the electronic air-supplying and pressure-equalizer system for tires of the present invention. The pneumatic equipment (35) of the working unit or machine (1) is the element in charge of managing the air flow which will permit to fill up or to empty tires until achieving the pressure desired. The pneumatic equipment (35) consists of four electrovalves (43, 44, 45, 46) communicating wheels with the pressure source or compressor (47), with the very measuring instrument through a transducer (48) and with the atmosphere (49). The electrovalves join together in a common node or hot node (50), to which the measuring instrument joins too.

Two of the electrovalves (43, 44) work simultaneously and are in charge of connecting distribution and connection means, such as hoses (21), coming from vehicle tires, to the hot node (50), so achieving a double effect on the one hand, pressures into both tires get equal in accordance with the principle of communicating vessels, and at the same time, it is possible to measure the pressure of the grip between the wheels. The use of two electrovalves (43, 44) does not permit the cross balancing of wheels as hoses (21) change between one axis and the other.

Once the above set of tire electrovalves is open, one of the two remaining electrovalves (45) joins the hot node (50) with the compressor in order to thereby increase pressure.

Once the above set of tire electrovalves is open, the second of the two remaining electrovalves (46) joins the hot node (50) with the atmosphere in order to thereby decrease pressure.

Likewise, the pneumatic equipment (35) has a non return valve (51) located at the pneumatic set pressure inlet, in order o avoid that, in the absence of pressure inside the compressor, tires could deflate.

Pneumatic set (35) is complemented with several means for protecting the measuring instrument against water an dirtiness existing in the installation and/or in the compressor, as well as against pressures higher than those the measuring instrument can support, such as, preferably, a filter (52) and a regulator (53).

The propeller or compressor equipment (not shown in figures) of the electronic air-supplying and pressure-equalizer system for tires provides dry air at a pre-established minimum pressure. The compressor can be either interior, so suitably sizing the outer housing in order to lodge the compressor, or external, in which case, a larger and therefore more powerful compressor can be used, thereby favoring the response time of the system.

The electronic air-supplying and pressure-equalizer system for tires of the present invention whose configuration has been disclosed above, is provided with different modes of working which user can choose. The three modes of working which the electronic air-supplying and pressure-equalizer system for tires has are: checking-balancing mode, manual inflating-balancing mode and automatic inflating-balancing mode.

The user begins the working of the electronic air-supplying and pressure-equalizer system for tires by connecting hoses (21) to vehicle tires through nozzles, introducing these into the valves in tires. Once this connection process is effected, it will be necessary to wait for a moment until reading becomes stabilized. This time is the required for pressure values inside both wheels to become equal, in the case of two wheels at each axis. Next, it should be selected whether to increase or decrease pressure based on the pressure being visualized and pressure that is aimed to reach. Once decision has been taken, it is possible to work the appropriate valve in each case. Time that this action should take will depend on various factors, the most remarkable being the difference between current pressure and pressure to be reached, the difficulty for air to pass through the pneumatic system, and the pressure compressor supplying the air necessary in case of desiring to increase the barometric value. Since it seems to be difficult to achieve the desired pressure by activating only once the appropriate electrovalve for a determinate time, generally, an electrovalve should be worked, then it should be waited until pressure becomes stabilized and a new decision is taken about the action to do, which will depend, as before, on the pressure value read and that to be reached. Once decision is taken, the appropriate electrovalve should be worked, said process being repeated so many times as it were necessary, until desired pressure is achieved.

In relation to the handling by the user, this can decide between being him/her-self who compares, takes the decision and repeatedly acts on the machine (manual mode) or letting the machine itself carry out the process (automatic mode), the pressure value desired to be achieved being previously fixed through the keyboard (37), either by directly introducing the value, or by preselecting one of the pre-established values arranged on the keyboard (37). Likewise, user has the possibility to check and equalize pressures inside the tires of the same vehicle axis.

The electronic air-supplying and pressure-equalizer system for tire is provided with an acoustic warning device which indicates by an acoustic signal that system has finished the inflating-balancing process, so the pre-determined value being reached, when the system works at the automatic inflating-balancing mode.

Finally, the electronic air-supplying and pressure-equalizer system or tires of the present invention is provided with different selectable cashing means such as free mode or payment mode as selected by system's operator and, when choosing the payment mode, it is provided with various options: coin payment (39) or card payment (40), either with the own card comprising a determined number of services or with money-card of any bank, eligible by the user. Said coin-box (39) comprises a groove through which the necessary coin(s) should be introduced in order to switch the system on. In the case a defective coin were introduced and blocked up, it will be recovered by pressing the return button located below the groove, thereby coin will appear in a box located below the button. Likewise, if coin were inappropriate or system were either unplugged from the network on working, the coin would be automatically returned.

FIGS. 9 to 12 show alternative embodiments of the unit of distribution of the electronic air-supplying and pressure-equalize system for tires of the present invention.

Figure 9:
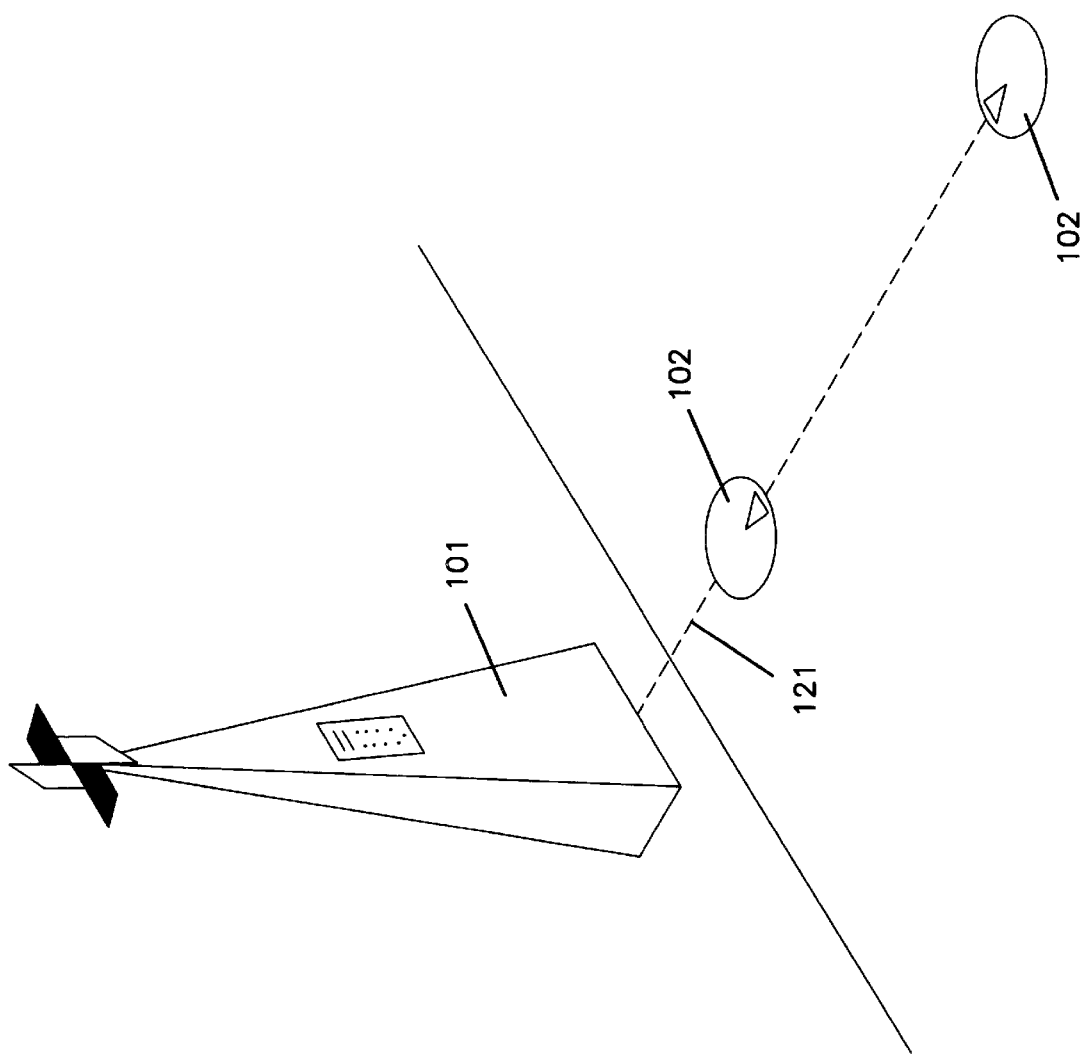
FIG. 9 diagrammaticaly shows a view of a second preferred practical embodiment of the electronic air-supplying and pressure-equalizer system for tires, comprising two inflating modules or devices.

FIG. 9 diagramatically shows a second preferred embodiment of the electronic air-supplying and pressure-equalizer system for tires, having a series of inflating conduits or hoses (121) carrying the inflating gas, preferably compressed air, coming from the working unit (101) of the kind disclosed above.

Said second practical embodiment consists of two inflating module or devices (102) doing the following functions: support of the conduits or hoses (121), location of the conduits or hoses and coupling thereof to vehicle tires to be inflated or whose pressure is desired to check, and automatic withdrawal and/or return of said conduits or hoses (121) from their working position up to their rest position. Pressure control of each tire is carried out through the central control unit, similar to that disclosed in FIGS. 1 to 8. The two inflating modules or devices (102) are located in diametrally opposite positions, so that the user who desires to use the electronic air-supplying and pressure-equalizer system for tires should park the vehicle between both inflating modules or devices (102), each one of the inflating modules or devices of rear and fore tires being approximately equidistant to each corresponding side of the vehicle. The inflating modules or devices (102) are placed at a gap of, preferably, between 1.75 m and 2.80 m, more preferably between 1.90 m an 2.50 m between themselves, and, in any case, according to the width of vehicles to operate with the present inflating installation.

Inflating conduits or hoses (121) extend from the deposit or compression unit to inflating modules through underground pipes, going through a working and control unit (101).

Figure 10A:
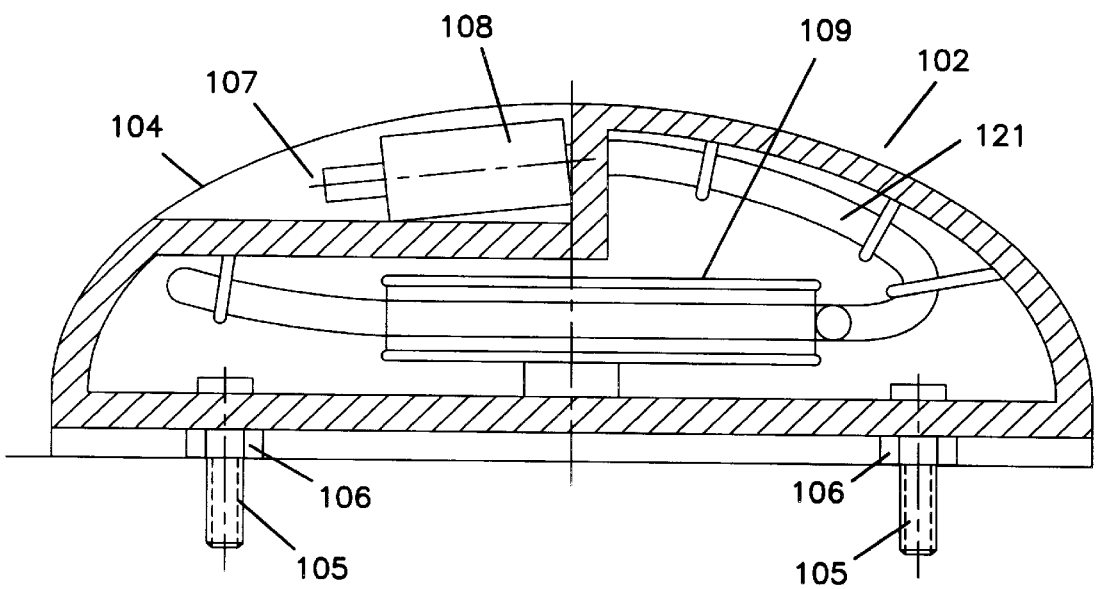
FIG. 10a shows the cross-sectioned inside of the inflating module or device corresponding to the second practical embodiment represented in FIG. 9.
Figure 10B:
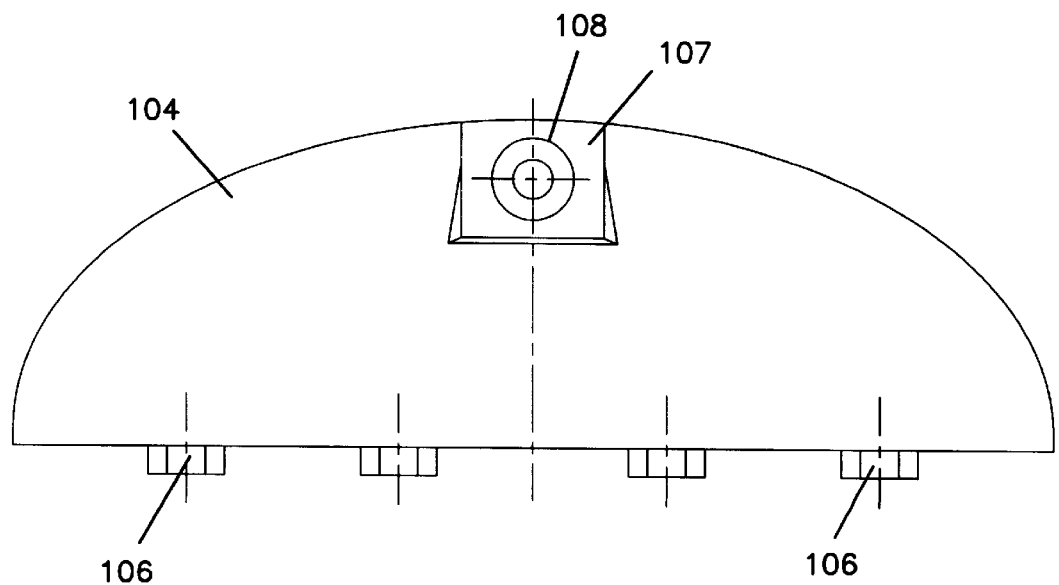
FIG. 10b shows a front view of the outside of the inflating module or device corresponding to the second practical embodiment represented in FIG. 9.

FIGS. 10a and 10b diagrammaticaly show different views of inflating modules or devices (102), which have a housing made of a resistant material, preferably metal or the like, shaped as a semi-spherical cap, in whose inside an extensible inflating conduit or hose (121) is lodged, the housing (104 being thereby constituted as the means for supporting the inflating conduit or hose (121). The housing (104) has, at its lower side, means for the anchorage and fixing to the ground, preferably constituted by threaded screws (105) introduced into the ground, secured by conventional nuts (106). Likewise, the housing (104) has, on its upper surface, an outlet hole (107) to extract the inflating conduit or hose (121) and to thereby couple the inflating valve (108), arranged at its free end, to the tire valve.

Likewise, inside the housing (104), there are automatic means for the returning and withdrawal of the inflating conduit or hose lodged therein, constituted by a channeled wheel (09) horizontally arranged with a device of springs which makes it to automatically revolve in a sense, so that the conduit or hose (121) used, which is stretched and acted from the housing (104), is withdrawn up to its rest position by the automatic coiling means.

Figure 11:
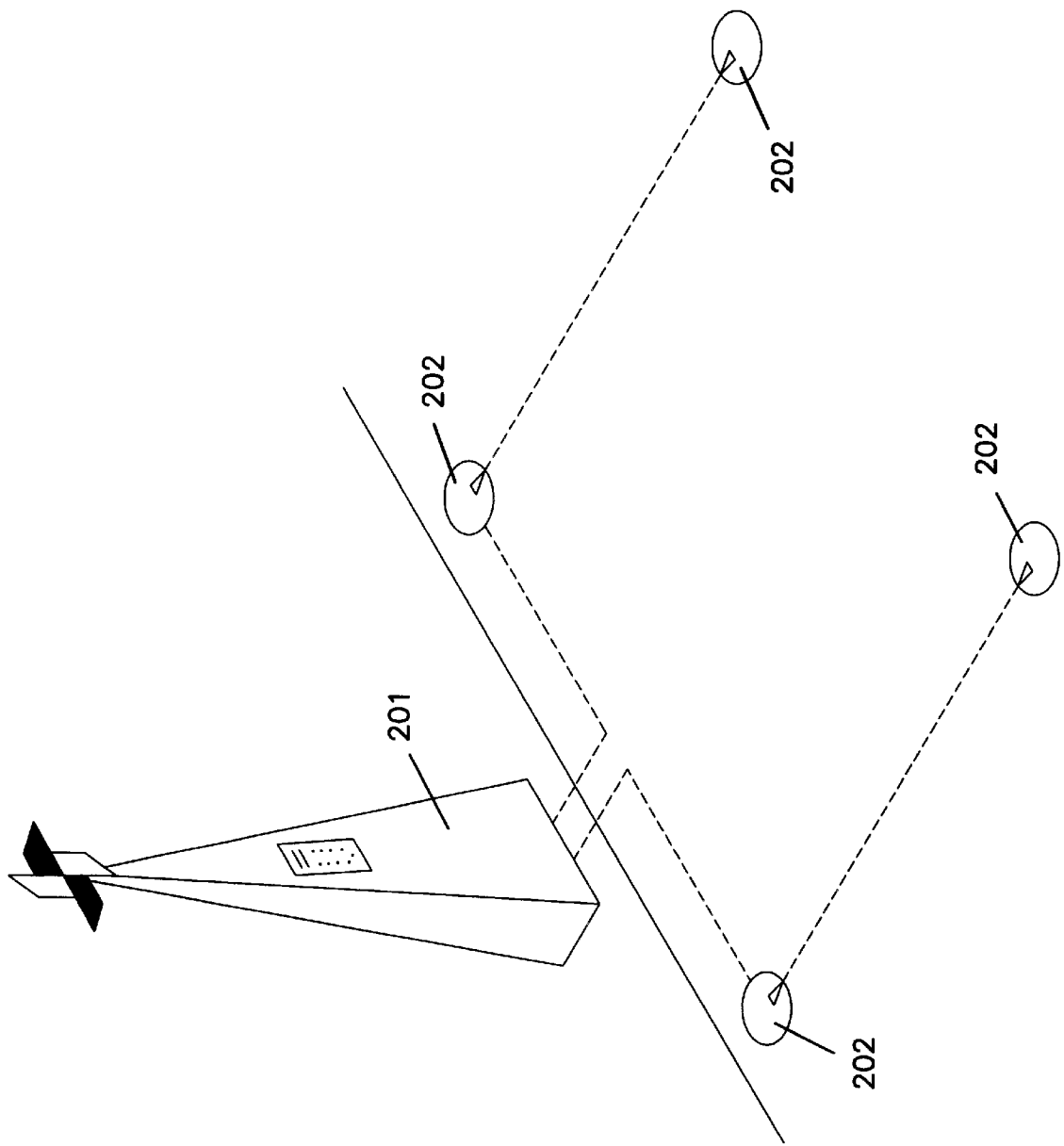
FIG. 11 diagrammaticaly shows a view of a third preferred practical embodiment of the electronic air-supplying and pressure-equalizer system for tires, comprising four inflating modules or devices.

FIG. 11 shows a third preferred embodiment of the electronic air-supplying and pressure-equalizer system for tires, similar to hat shown in FIG. 9, which is provided with four inflating modules or devices (202) identical to those disclosed above distributed on an imaginary rectangle, in order to work one vehicle tire from each one, so that the user who wants to use the inflating installation should park the vehicle on the imaginary rectangle, placing each one of the vehicle tires approximately equidistant to the corresponding inflating module or device again, pressure control of each tire is carried out through a central control and working unit (201). As in foregoing cases, gaps have to be suitable to park the vehicle on the imaginary rectangle, allowing an appropriate maneuverability margin.

Figure 12:
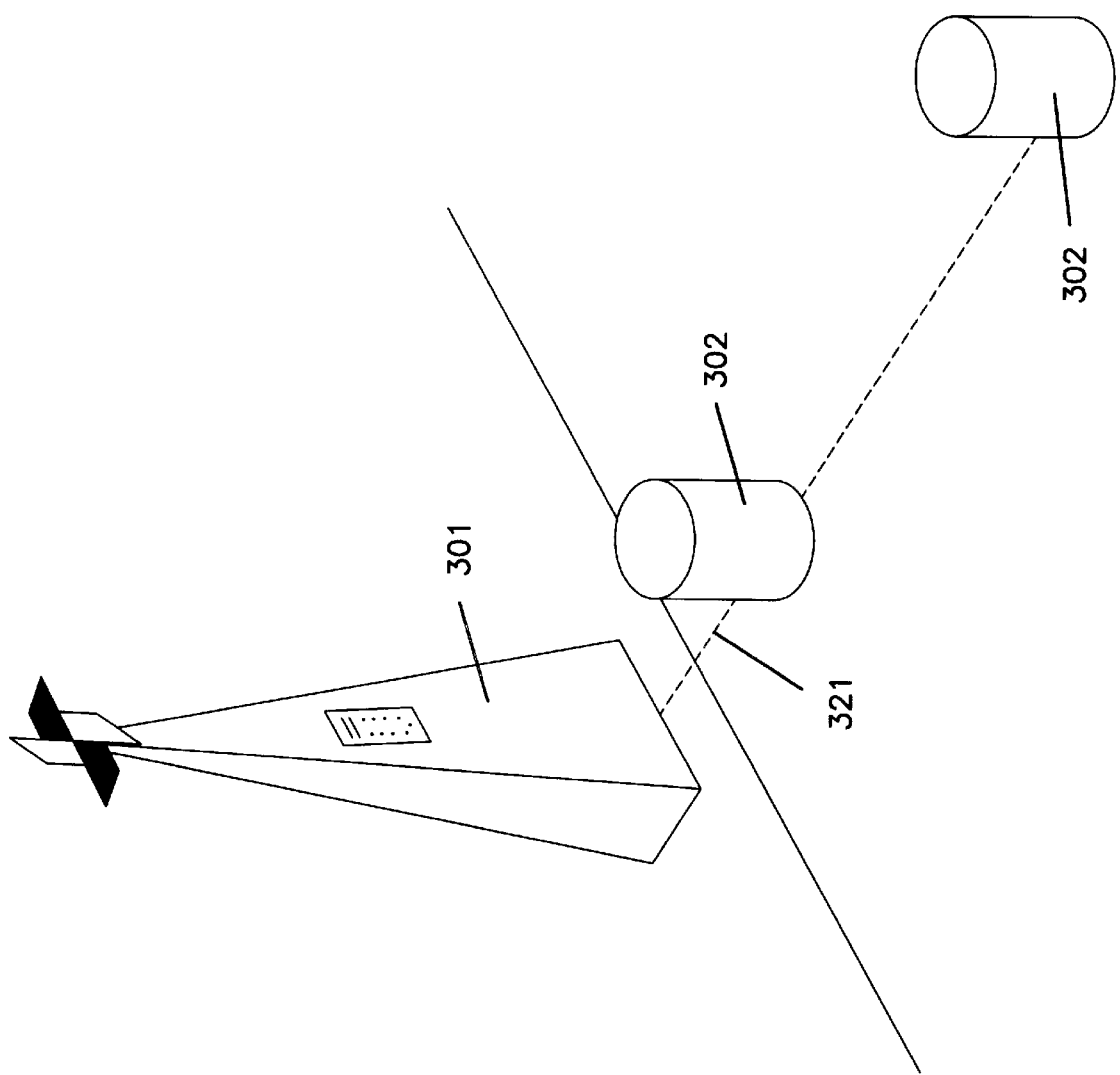
FIG. 12 diagrammaticaly shows a view of a fourth preferred practical embodiment of the electronic air-supplying and pressure-equalizer system for tires, comprising two inflating modules or devices.
Figure 13:
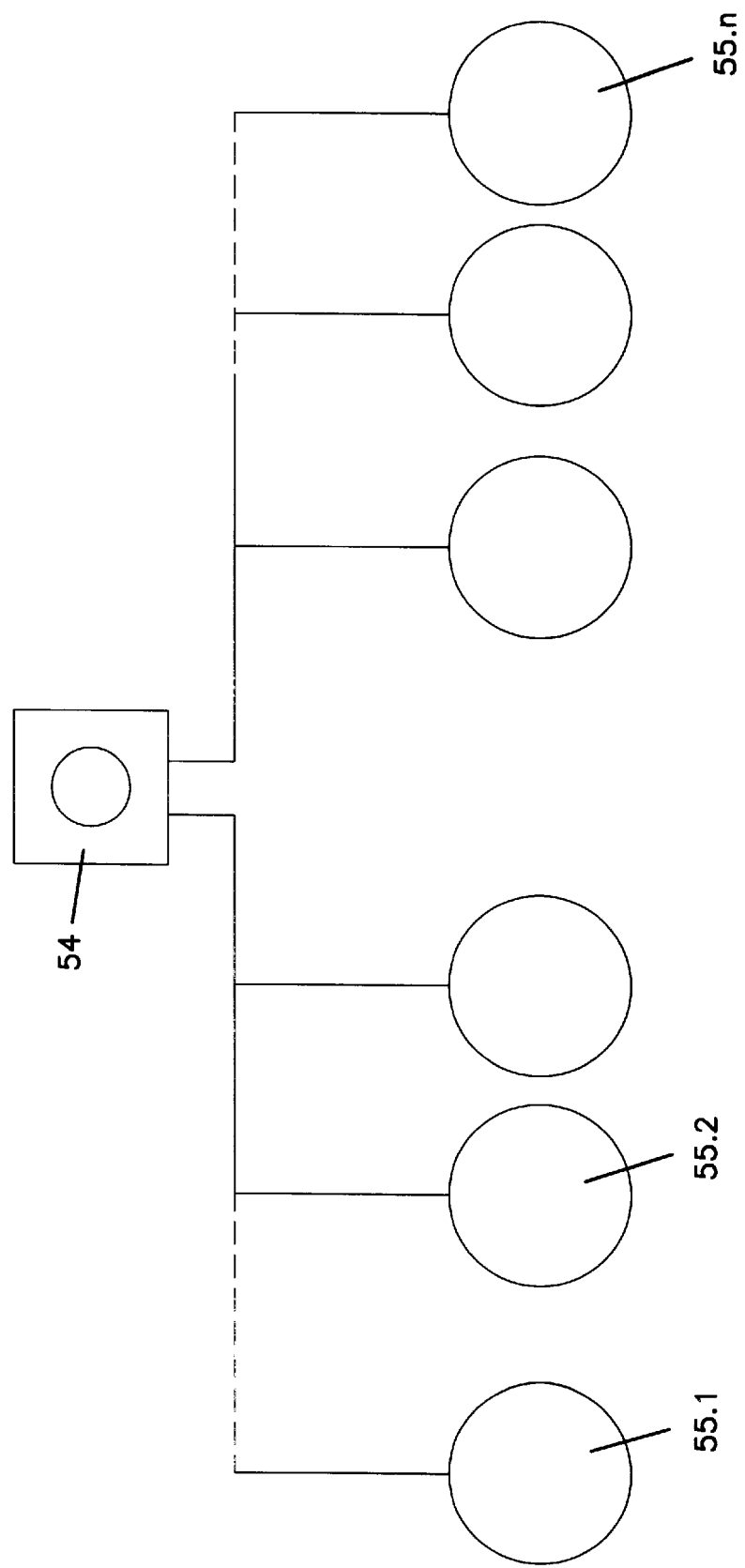
FIG. 13 shows the sketch of an embodiment of a multi-user system of the electronic air-supplying and pressure-equalizer system for tires.

Finally, FIG. 12 shows a fourth practical embodiment of the electronic air-supplying and pressure-equalizer system for tires similar to that shown in FIGS. 9 and 11, in which inflating modules or devices have a cylindrical shape (302) as body the features of each one of the autonomous terminals (55.1, 55.2, . . . 55.n) may adopt any one of the embodiments mentioned above. The so suggested multi-station configuration may complement the inflating and pressure control fuctions of each autonomous terminal (55.1, 55.2, . . . 55.n) with further functions, typical of a carwashing centre such as washing, vacuum cleaning, rug cleaning, etc.

Once the nature of the present invention, as well as several ways for putting it into practice have been sufficiently disclosed, it only remains to add that it is possible to introduce, in its whole or parts, variations in shape, materials and disposal, provided that said variations would not substantially those features of the invention which are claimed below.

What is claimed is:

1. An electronic air-supplying and pressure-equalizer system for tires, comprising:
   a) compressor equipment having a compressing unit;
   b) a working unit having:
      i) a housing with a plurality of sides, at least one of the sides made from metal terne plate with surface corrosion proofing, and the remaining sides made of material resistant to atmospheric agents, and said metal terne plate side including at least one gate permitting access to an interior of said housing; the housing further including ventilation means located adjacent at least one of an upper or lower end of the housing, a metal framework consisting of a metal structure made of L-shaped cross-section profiles bent into right angles and secured together and including a corrosion-resistant coating;
      ii) an electronic measuring instrument comprising an electronic set formed by three intelligent modules including a visualizer-supervisory module, a keyboard module, and an adjustment module; the electronic measuring instrument further comprising a pnuematic control and power supply module, and communication and supply buses between said modules; and
      iii) pneumatic equipment consisting of four electrovalves capable of: communicating the compressing unit with the tires, communicating the tires with the electronic measuring instrument through a transducer, and communicating the tires with atmosphere; said electrovalves and said electronic measuring instrument being connected at a common node; and said pneumatic equipment being provided with a non-return valve controlling supply pressure to the pneumatic equipment;
   c) a supporting unit, said supporting unit made from corrosion resistant material and provided with means for fixing the supporting to the ground; and
   d) an air delivering unit.

2. The electronic air-supplying and pressure-equalizer system for tires according to claim 1, wherein said visualizer-supervisory module includes a microcontroller, a visualizer, a series-parallel interface for managing the visualizer, a protected wiring memory, a supply control circuit, an infrared receiving circuit, a battery and a load circuit; whereby said visualizer-supervisory module is capable of: presenting a pressure measure, storing information introduced from outside through the keyboard module, supervising the operation of the system, managing information received from other modules, deciding the process to be effected, and sending appropriate orders through the communication bus to the other modules.

3. The electronic air-supplying and pressure-equalizer system for tires according to claim 1, wherein the keyboard module includes a microcontroller, an interface between the microcontroller and a keyboard, light indicators, and at least one cashing mechanism; whereby said keyboard module is suitable to receive orders and to communicate the orders to the visualizer-supervisory module.

4. The electronic air-supplying and pressure-equalizer system for tires according to claim 1, wherein the adjustment module includes a microcontroller, an analog-digital converter with differential input, a low noise linear amplifier, and a pressure transducer; whereby the adjustment module is suitable to: convert information regarding barometric pressure into a numerical digital value; operate the electrovalves; and permit manual or automatic realization of necessary pressure-adjustment processes to achieve a desired pressure.

5. The electronic air-supplying and pressure-equalizer system for tires according to claim 1, wherein the electronic measuring instrument includes a power supply source provided with voltage stabilizers, a power supply monitoring system capable of detecting voltage drops below a safety value and capable of supplying an initialization signal to the modules, an efficiency control system for managing the pneumatic equipment.

6. The electronic air-supplying and pressure-equalizer system for tires according to claim 1, further including a remote control to permit selection of inflating pressure, the remote control comprising a keyboard, a converter to convert a signal generated by the keyboard into a signal, and a signal transmitter capable of emitting the signal; the working unit including a signal receiving circuit provided with a transducer capable of converting a received signal into an electrical signal, and said signal receiving circuit is connected to said visualizer-supervisory module to permit transmission of the electrical signal thereto.

7. The electronic air-supplying and pressure-equalizer system for tires according to claim 1, wherein:
   two of said electrovalves work simultaneously and are capable of connecting distribution and connection means coupled to the tires to said common node;
   one of the other electrovalves is capable of joining the common node with the compressing unit; and
   the final said electrovalve is capable of joining the common node with atmosphere.

8. The electronic air-supplying and pressure-equalizer system for tires according to claim 1, wherein said pneumatic equipment includes means for protecting the electronic measuring instrument against water, dirt, and pressures higher than said electronic measuring instrument can support, said means for protecting including a filter and a regulator.

9. The electronic air-supplying and pressure-equalizer system for tires according to claim 1, wherein the air delivering unit comprises:
   a) one of a static and movable location, each said location including inflating conduits;

b) means for return of said conduits from a working position to a rest position.

10. The electronic air-supplying and pressure-equalizer system for tires according to claim 9, wherein said air delivering unit includes a tubular supporting structure, said tubular supporting structure including a lower end thereof connected to said supporting unit; a first vertical tubular portion connected to an opposite end of said tubular supporting structure, and a second tubular portion connected to an end of said first vertical tubular portion, the second tubular portion including a curved portion and a portion parallel to the ground, a bar extending between the first vertical tubular portion and the second tubular portion supporting and reinforcing the portion parallel to the ground, and wherein said inflating conduits extend through the inside of said tubular supporting structure, said inflating conduits exiting the air delivering unit through at least one suitably provided hole in the tubular supporting structure or through a plurality of holes in the second tubular portion, the holes in the second tubular portion having a gap of between 1.75 m and 2.80 m, and the portion that is parallel to the ground having a height of more than 1.70 m above the ground.

11. The electronic air-supplying and pressure-equalizer system for tires according to claim 10, wherein said air delivering unit further includes location means between the tubular supporting structure and said first vertical tubular portion permitting relative rotation between the tubular supporting structure and said first vertical tubular portion; said location means comprising a nylon bearing composed of two coupled cylinders which allow a 90°–180° gyration of the first vertical tubular portion relative to the tubular supporting structure.

12. The electronic air-supplying and pressure-equalizer system for tires according to claim 9, wherein said means for return of said conduits comprises vertical coilings extending from said second tubular portion.

13. The electronic air-supplying and pressure-equalizer system for tires according to claim 1, wherein the system has the following modes of operation:
    a) checking-balancing mode, selected from the keyboard module, for carrying out checking of tire pressure as well to balance pressure inside tires on the same axle, with tire pressure being displayed by the visualizer-supervisory module;
    b) manual inflating-balancing mode for effecting manual pressure adjustments, selected from the keyboard module; and
    c) automatic inflating-balancing mode for effecting pressure adjustments up to a value introduced through the keyboard module.

14. The electronic air-supplying and pressure-equalizer system for tires according to claim 13, further including an acoustic warning device which provides an acoustic signal when the system has finished the inflating-balancing process in the automatic inflating-balancing mode.

15. The electronic air-supplying and pressure-equalizer system for tires according to claim 1, wherein the system includes different cashing modes, including:
    a) free mode; and
    b) payment mode, said payment including a coin payment mode and a card payment mode.

16. The electronic air-supplying and pressure-equalizer system for tires according to claim 1, wherein the system includes remote control means to permit remote operation, said remote control means including a modem establishing communication between a central station and the system.

17. The electronic air-supplying and pressure-equalizer system for tires according to claim 1, wherein the system further includes a transmitter-receiver system operated by electromagnetic waves, a transducer for converting a received electromagnetic wave into an electric signal, and means for transmitting to the visualizer-supervisory module.

18. The electronic air-supplying and pressure-equalizer system for tires according to claim 1, wherein the system includes a distributed multi-station configuration comprising a set of autonomous use terminals controlled by a managing center, said managing center comprising a compressor, a control circuit capable of carrying out acceptance of cashing modes, store transactions, control service times and manage communications; said autonomous use terminals comprising a visualization device, a pressure control, a keyboard control, a payment control, and a pressure transducer.

* * * * *